United States Patent [19]
Scarritt, Sr.

[11] 3,834,036
[45] Sept. 10, 1974

[54] LANE STRIPE STEERING GUIDE

[76] Inventor: Francis M. Scarritt, Sr., 1338 Park St. North, St. Petersburg, Fla. 33710

[22] Filed: Nov. 13, 1972

[21] Appl. No.: 305,988

[52] U.S. Cl. ............................................. 33/264
[51] Int. Cl. ........................................ G01c 21/04
[58] Field of Search ..................................... 33/264

[56] References Cited
UNITED STATES PATENTS

| | | | |
|---|---|---|---|
| 1,429,166 | 9/1922 | Rommer | 33/264 |
| 1,610,477 | 12/1926 | Sanford | 33/264 |
| 2,046,581 | 7/1936 | Recves | 33/264 |
| 2,584,777 | 2/1952 | Adolfson | 33/264 |
| 3,064,617 | 11/1962 | Meagher | 33/264 |

*Primary Examiner*—William D. Martin, Jr.
*Assistant Examiner*—Steven L. Stephan

[57] ABSTRACT

The invention provides visual guide means for use on vehicles, namely, sighting members in the line of view between the driver and painted lane stripes by which a driver can with assurance maintain the vehicle properly within a lane. Such sighting members are similar to open top target sights but of much larger dimension and provided with attachment means to be secured to forwardly extending portions of a vehicle, such as hood or fenders, or to the windshield, depending on type of vehicle. The sighting members are fixed in position so that a driver can sight across them from his normal driving position to view lane stripes at a point ahead of the vehicle so that at normal road speeds he has sufficient time to control steering to maintain the vehicle safely between stripes, or between a stripe and the edge of a road.

3 Claims, 17 Drawing Figures

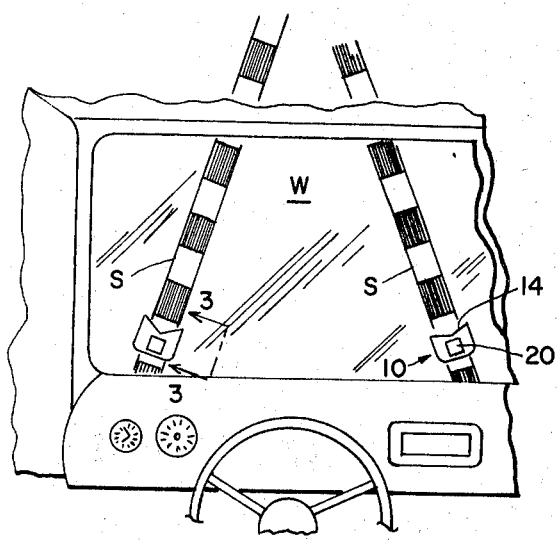
Fig. 1
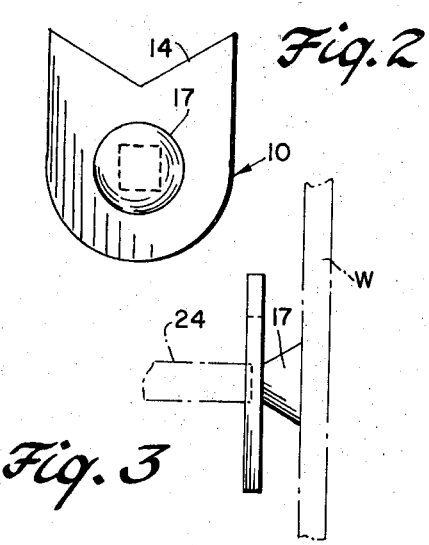
Fig. 2
Fig. 3
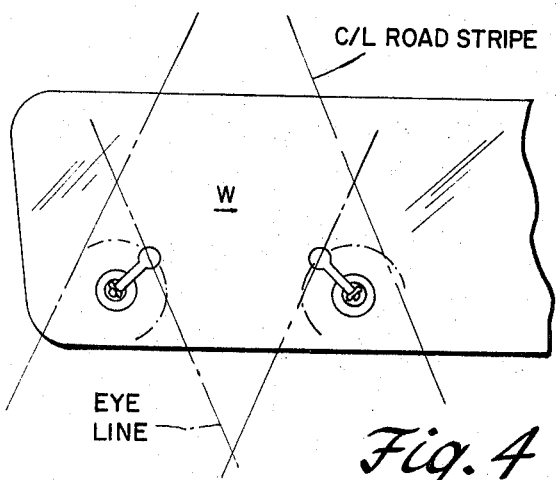
EYE LINE
C/L ROAD STRIPE
Fig. 4
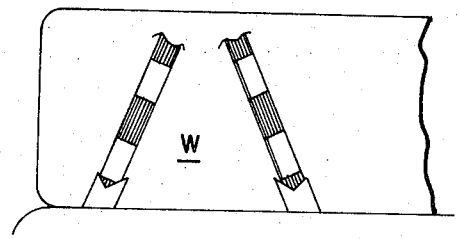
Fig. 8a
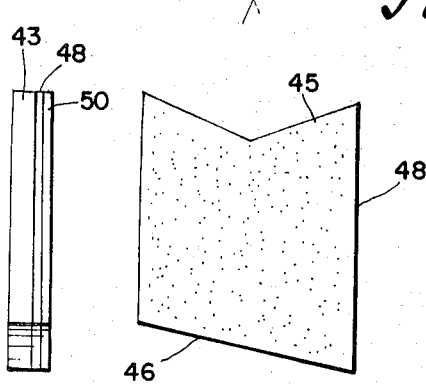
Fig. 7  Fig. 8
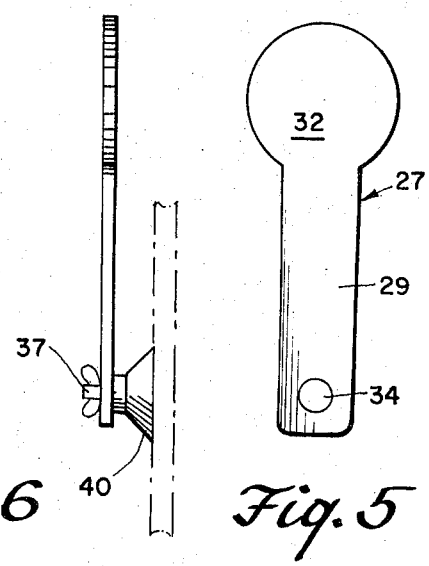
Fig. 6  Fig. 5

LANE STRIPE STEERING GUIDE

Briefly, it has been found that some motorists have difficulty in properly guiding their vehicles between the painted lane stripes, particularly where such stripes may be narrowly spaced. Such difficulty is especially pronounced in vehicles of the type where the cab is at the very front of the vehicle over the engine. Thus, there is no vehicle formation such as hood and fenders forwardly of the windshield to serve as reference points to the eye of the driver in maintaining the vehicle between a pair of parallel lane stripes.

The present invention alleviates the difficulties which some drivers experience in maintaining their vehicles properly aligned and is particularly helpful in cab over engine type vehicles such as trucks, campers, and the like.

A detailed description of various constructions of the invention will now be given in conjunction with the appended drawing in which:

FIG. 1 is a fragmentary view of a corner of a vehicle looking outwardly through the windshield from the driver position, with indicators of the invention applied thereto;

FIG. 2 is a view of one of the lane indicator devices as seen from the outer side;

FIG. 3 is an edgewise view shown in the direction 3—3 of FIG. 1;

FIG. 4 is a view similar to FIG. 1 but showing a modification;

FIG. 5 shows the indicator of the modification; of which

FIG. 6 is an assembled edgewise view;

FIG. 7 is an edgewise view of another modification; of which

FIG. 8 is a plan;

FIG. 8a shows the modification of FIGS. 7 and 8 applied to a windshield;

FIG. 9 is a view of a further modification; of which

FIG. 12 is a front view of a still further modification; of which

Figure 9:
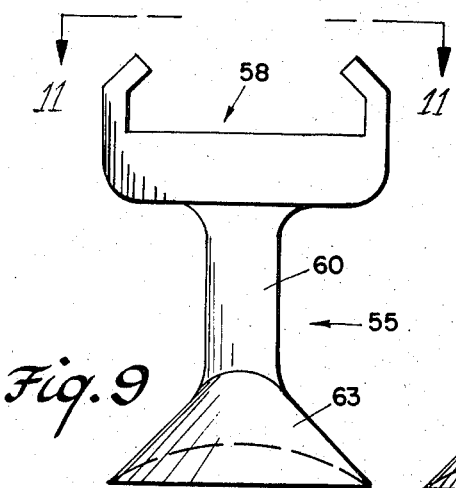

Referring to the form shown in FIGS. 1-3, the invention comprises an indicator 10 which may be of molded rubber or plastic and of the preferable order of an inch and a half to two inches, or even larger, in width and height having a top V notch 14 for sighting purposes. By utilizing a soft moldable material, the indicator 10 may have integrally molded and extending from one face thereof a suction cup 17. The suction cup provides adherence to a windshield W as seen in FIG. 1. The indicators are fastened to the windshield with such spacing and angularity as to effect sights across which a driver may view respective lane stripes S, sighting through or across the V notches at a distance of 20–50 feet ahead. Thus, the driver sitting in his normal position can readily guide his vehicle so as to accurately steer between the lane stripes.

The positioning of the indicators on the windshield is readily accomplished by placing the vehicle accurately between a pair of lane stripes on a road, or simulated lane stripes on a street, or elsewhere, and then placing the indicators to the proper positions comfortable for the driver's view. Each indicator can thus be positioned and turned and pressed against the windshield to cause adherence of the suction cup.

As a matter of convenience in applying the indicators, the driver can sit in his normal driving position while a helper shifts the indicators to points at which the driver tells him positioning is correct. Alternatively, the driver can affix the indicators himself by a minimum of experimental positioning. If desired, the indicators can be molded on the driver's side with shallow depressions, such as 20, into which a wood stick 24 may be thrust. Such stick, a couple of feet long, would enable the driver sitting in his normal position to readily manipulate each indicator for proper viewing and then push the stick to press the suction cup for adherence. The cavity 20 may be square in order to key the stick to the indicator for rotation, or a circular cavity frictionally gripping the end of a round dowel stick would suffice.

In the form of the invention shown in FIGS. 4–6, a thin plate 27 having an arm 29 and a disc area 32 can be used for an indicator. This is similar to the sight on certain rifles although, of course, of greatly enlarged dimensions being, perhaps, some two inches, or so, long. Such indicator may have an aperture 34 through which a screw and wing nut holding means 37 of a suction cup 40 may protrude. Indicators such as 27 can be readily adjusted for angularity by simply loosening the wing nut arrangement and swinging the indicators to any desired position on the arcs shown on FIG. 4, thereafter tightening the wing nuts.

In the form of the invention shown in FIGS. 7 and 8, the indicator can be a plate 43 of any die cut material or sliced from an extrusion of a generally rectangular shape having a V notch 45 and a slanted lower edge 46. One face of the indicator is coated with a pressure sensitive adhesive 48 covered by a peelable strip 50 in a known manner. Thus, upon peeling the strip 50 away from a pair of indicators, they can be lightly applied to a windshield for temporary holding so as to be readily pulled away in order to adjust to the precise position desired by the driver. When such precise positions are effected, pressure brought to bear will cause permanent adherence. The slanted lower edges of a pair of indicators 46 can be set against the bottom frame of a windshield W as shown in FIG. 8a to automatically position them for angularity. Of course, the indicators would be provided as a pair, a left and right, due regard being had for the direction of slant. In other words, the indicators are made as mirror images of each other.

It should be noted that the thickness of the plate 43 as shown in FIG. 7 is only illustrative and in fact, such plate could be thin plastic or even cardboard or paper.

Figure 10:
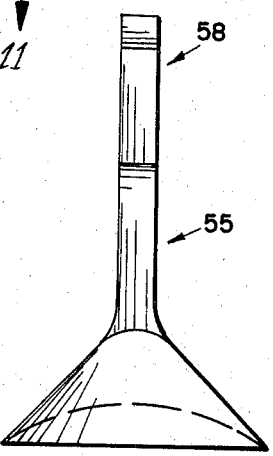
FIG. 10 is an edgewise view.
Figure 11:
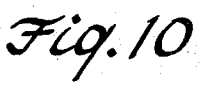
FIG. 11 is a top view.
Figure 14:
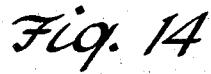
FIG. 14 is a view showing the application of the modification of FIG. 12 to a vehicle.

The form of the invention shown in FIGS. 1–8, are intended primarily for vehicles of the cab over engine type but could be used for regular passenger vehicles as well. However, the modification shown in FIGS. 9–16 is particularly adapted for regular passenger vehicles since such indicators can be secured to the hood and fenders. Thus, the form shown in FIGS. 9–11 is an integrally molded indicator 55 having a ram's horn type of sight 58 carried on a stem 60 which terminates in a suction cup 63. As seen in FIG. 14, a pair of such indicators can be secured to the hood and one fender of a passenger vehicle at the proper distance from the driver's position so that he can conveniently sight through the ram's horn formations at lane stripes ahead of the vehicle to achieve the viewing effect shown in FIG. 1.

Figure 12:
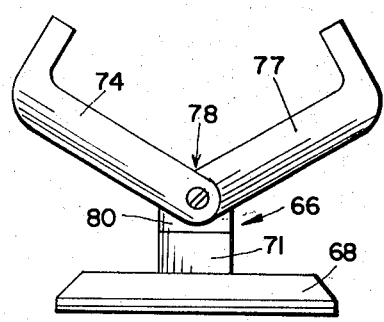
Figure 13:
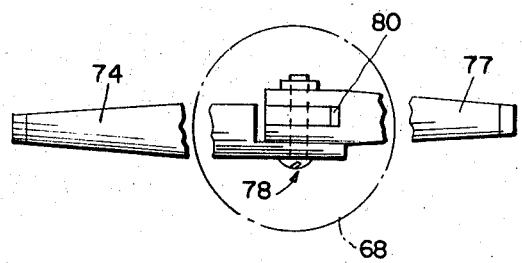
FIG. 13 is a top view.

FIGS. 12 and 13 show an indicator 66 which may be comprised of solid molded plastic pieces such as a base 68 and stem 71 which carries a pair of angularly adjustable arms 74 and 77 of L-shape to give the ram's horn effect as shown. The arms are suitably notched as shown in FIG. 13 so as to be secured as by a nut and bolt 78 to the narrowed tongue 80 extending up from stem 71. It will be obvious that the arms can be adjusted to any desired angulared position by loosening and tightening the nut. Such adjustability may be advantageous in increasing or decreasing the gap of view depending upon what distance ahead of the vehicle the driver prefers to sight the stripes. This allows the driver to view the strip at some distance from the vehicle, say 50–100 feet. At longer distances the arm gap would be reduced since the stripe width at such distance would appear narrower. Further the adjustability permits leeway as to how far from the driver the indicators would be placed on the hood or fenders.

Figure 15:
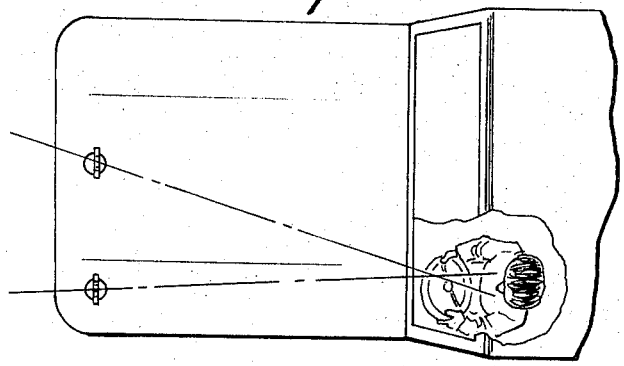
FIG. 15 is a construction showing a sighting member mounted on a spring.
Figure 15:
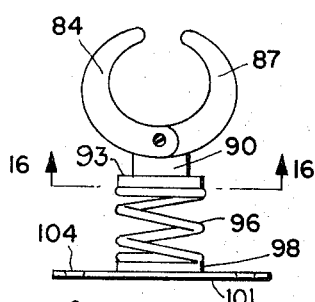
Figure 16:
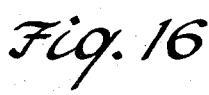
FIG. 16 is a view in the direction 15—15 showing the upper spring socket.

Referring to FIGS. 15 and 16 a sighting member is illustrated comprised of two curved elements 84 and 87 which may be of molded plastic fastened together for pivotal adjustment as by a screw, to a tongue 90, as in the construction of FIGS. 12 and 13. In this instance the tongue 90 is intregal with an upper spring socket 93 in which is socketed the top end of a helical spring 96 having a lower or base socket 98 with a securement means such as a screw flange 101 intregal therewith and provided with screw holes such as 104. The sockets and base flange are circular and the tongue and upper socket may be of molded plastic in an intregal piece as can the base socket and screw flange 101. Two or more screw holes may be provided.

In the construction just described, in the event of the indicator being struck it will yield due to the spring mounting and thus not be subject to breakage, the spring returning it to upright position. For permanence of securement screws are preferred inasmuch as this modification is intended to be mounted on the fenders or hood of a vehicle.

What is claimed is:

1. A steering guide sighting member having an edge past which a vehicle driver can sight to view a lane edge at one side of a vehicle at a point ahead of said vehicle for lateral guidance of said vehicle; attachment means for attaching said sighting member to the windshield of said vehicle at a selected location thereon in a line of sight between the driver and the edge of a lane whereby said driver can view said lane edge at a predetermined point ahead of said vehicle; said sighting member comprising a substantially flat element and the said edge thereof having a V-notch through which a lane edge may be viewed, and said flat element having an adhesive coating as attachment means to attach it to said windshield; said element having its lower edge slanted to be positioned substantially parallel to the lower edge of the frame of a windshield for angular orientation of said sighting member.

2. A steering guide means as set forth in claim 1, including an additional sighting member having an oppositely sloped slanted edge.

3. A steering guide as set forth in claim 1, said V-notch being generally at the upper edge of said flat member.

* * * * *